(12) United States Patent
Sen et al.

(10) Patent No.: US 8,374,762 B2
(45) Date of Patent: Feb. 12, 2013

(54) TRAVEL SPEED LIMITING APPARATUS

(75) Inventors: Naoto Sen, Utsunomiya (JP); Hiroshi Sato, Utsunomiya (JP); Tadayoshi Okada, Shioya-gun (JP); Kenichi Nishida, Utsunomiya (JP); Yasuhiko Tomokuni, Shioya-gun (JP); Hideo Nakahama, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 911 days.

(21) Appl. No.: 12/183,103

(22) Filed: Jul. 31, 2008

(65) Prior Publication Data

US 2009/0037067 A1   Feb. 5, 2009

(30) Foreign Application Priority Data

Aug. 3, 2007  (JP) ................................ 2007-202947

(51) Int. Cl.
*B60K 31/00* (2006.01)
*G06F 17/00* (2006.01)
*B60T 8/32* (2006.01)

(52) U.S. Cl. ............. 701/70; 701/93; 340/905; 180/170

(58) Field of Classification Search ................ 701/1, 36, 701/70, 85, 90, 91, 93, 94, 99, 29.1, 30.4, 701/30.5; 180/170, 178, 179; 340/438, 439, 340/901, 905, 441

See application file for complete search history.

(56) References Cited

U.S. PATENT DOCUMENTS 5,575,350 A * 11/1996 Kiryu et al. ................... 180/197
6,134,498 A * 10/2000 Oba ............................... 701/84

FOREIGN PATENT DOCUMENTS

| JP | 08-151946 A | 6/1996 |
| JP | 11-294215 A | 10/1999 |
| JP | 2002-266665 A | 9/2002 |
| JP | 2003-041963 A | 2/2003 |
| JP | 2004-050904 A | 2/2004 |
| JP | 2004-239207 A | 8/2004 |

OTHER PUBLICATIONS

Notice of Allowance dated Oct. 25, 2011.

* cited by examiner

*Primary Examiner* — Thomas Tarcza
*Assistant Examiner* — Edward Pipala
(74) *Attorney, Agent, or Firm* — Arent Fox LLP (57) ABSTRACT

A travel speed limiting apparatus including: a travel speed measurement device which measures a travel speed of a vehicle; a speed limit memory device which stores a speed limit set by an operator; a first driving force limit value calculation device which calculates a first driving force limit value based on a deviation of the travel speed from the speed limit; a requested driving force calculation device which calculates a requested driving force based on an operator's acceleration operation; and a second driving force limit value calculation device which calculates a second driving force limit value based on the requested driving force, wherein the driving force limiting device sets an eventual driving force limit value to the smaller of the first driving force limit value and the second driving force limit value, and controls the driving force of the vehicle to be less than the eventual driving force limit value.

8 Claims, 5 Drawing Sheets

TRAVEL SPEED LIMITING APPARATUS

BACKGROUND OF THE INVENTION

Priority is claimed on Japanese Patent Application No. 2007-202947, filed Aug. 3, 2007, the content of which is incorporated herein by reference.

FIELD OF THE INVENTION

The present invention is related to a travel speed limiting apparatus for a vehicle.

DESCRIPTION OF THE RELATED ART

A travel speed limiting apparatus (variable speed limiter) controlling a speed of a present vehicle so as not to exceed a driver's predetermined speed is known (see, for example, Japanese Unexamined Patent Application, First Publication No. H11-294215).

Figure 5A:
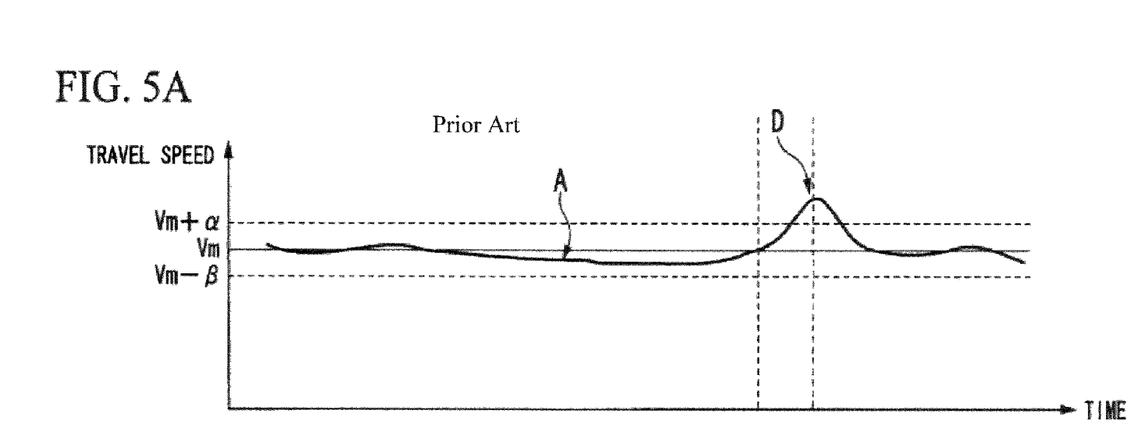
FIG. 5A and FIG. 5B are graphs showing a relationship between AP opening and travel speed in a conventional travel speed limiting apparatus.
Figure 5B:
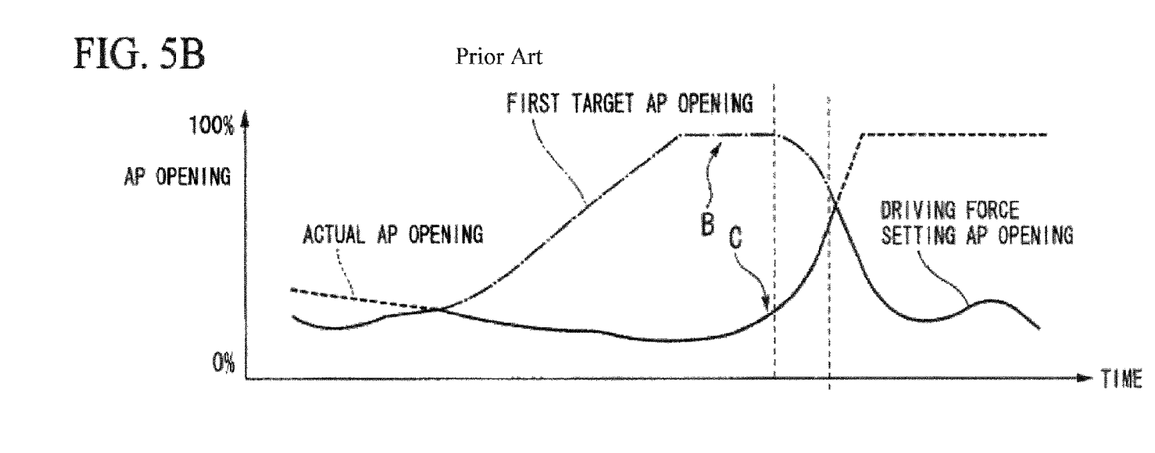

FIGS. 5A and 5B are graphs showing the relationship between an accelerator pedal opening and travel speed according to the conventional technology. In the conventional travel speed limiting apparatus, a target accelerator pedal opening (hereinafter referred to as an AP opening), as shown in FIG. 5B, is calculated so that the speed deviation (speed limit Vm—travel speed), as shown in FIG. 5A, becomes zero.

A driving force of the present vehicle is then determined based on the smaller of a target AP opening and actual AP opening performed by an operator (the driving force of the present vehicle is limited so as to be less than the limit value of the driving force, the limit value corresponding to the target AP opening)

Namely, in the case where a requested driving force in accordance with the actual AP opening is smaller than the limit value of the driving force, the engine is controlled such that the driving force of the present vehicle becomes the requested driving force. In the case where the requested driving force is greater than the limit value of the driving force, on the other hand, the engine is controlled such that the driving force of the present vehicle becomes the limit value. Accordingly, the present vehicle is controlled such that the speed thereof does not exceed the speed limit.

In the above-described conventional technique, the target AP opening is calculated with the following equation such that the speed deviation becomes zero.

Target AP opening=Previous target AP opening+Correction value based on the speed deviation(–Acceleration correction value)

According to the above equation, in the case where the travel speed is kept less than or equal to the speed limit Vm, as shown in FIG. 5A, the correction value based on the speed deviation is repeatedly added to the target AP opening ("A" portion in the figure). As a result, as shown in FIG. 5B, the target AP opening stays at 100% ("B" portion in the figure). If the operator depresses the acceleration pedal in this situation ("C" portion in the figure), the driving force of the present vehicle is continuously determined based on the actual AP opening until the target AP opening decreases to the appropriate value. As a result, there is a problem in that the travel speed exceeds the speed limit to a large degree because of the excess acceleration of the present vehicle.

For example, a travel with the travel speed of 98 km/h continues for a while under the speed limit of 100 km/h, the target AP opening increases gradually and eventually becomes 100%. In this situation, if the acceleration pedal is depressed, the travel speed increases, while the target AP opening decreases down to the appropriate value (e.g., 20%). However, because of the feed-back control based on the speed deviation, the decrease of the target AP opening does not keep up with the increase of the travel speed, and thereby the travel speed is kept greater than 100 km/h (overshoot) for a while.

The typical case where the overshoot of the travel speed is remarkable is, for example, a case where the speed limit is set low. In this case, the actual AP opening is kept low (e.g., 10%) in order to keep the travel speed less than the speed limit. For this reason, it takes a while for the target AP opening to decrease from 100% to around 10%, and thereby the travel speed is more likely to be higher.

In a similar manner, in the case of driving downhill, the overshoot of the travel speed is remarkable since the actual AP opening is kept relatively low.

In view of the above-described circumstances, the present invention has an object of providing a travel speed limiting apparatus which enables the travel speed of the present vehicle not to exceed the speed limit to a large extent (overshoot).

SUMMARY OF THE INVENTION

In order to solve the above-described problem, the present invention employs the following. Namely, the present invention employs a travel speed limiting apparatus including: a travel speed measurement device which measures a travel speed of a vehicle; a speed limit memory device which stores a speed limit set by an operator of the vehicle; a first driving force limit value calculation device which calculates a first driving force limit value based on a deviation of the travel speed from the speed limit; a requested driving force calculation device which calculates a requested driving force based on an acceleration operation by the operator; and a second driving force limit value calculation device which calculates a second driving force limit value based on the requested driving force, wherein the driving force limiting device sets an eventual driving force limit value to the smaller of the first driving force limit value and the second driving force limit value, and controls the driving force of the vehicle to be less than the eventual driving force limit value.

According to the above-described travel speed limiting apparatus, since the second driving force limit value is calculated based on the requested driving force and the eventual driving force limit value is set to the smaller of the first driving force limit value and the second driving force limit value, the correction value based on the speed deviation can be prevented from being accumulated even in the case where the travel speed is kept less than the speed limit. As a result, a significant excess of the eventual driving force limit value can be avoided. Besides that, since the driving force of the present vehicle is controlled so as to be less than the eventual driving force limit value, an acceleration of the present vehicle can be suppressed even in the case where the acceleration pedal is depressed. As a result, the travel speed can be prevented from significantly exceeding the speed limit.

It may be arranged such that the second driving force limit value calculation device employs a value higher than or equal to the requested driving force as the second driving force limit value.

It may be arranged such that the second driving force limit value calculation device calculates the second driving force limit value by adding a predetermined value to the requested driving force.

In these cases, since the eventual driving force limit value does not significantly excess the requested driving force, a significant increase of the first driving force limit value that is calculated on the basis of the eventual driving force limit value can be avoided. For this reason, the driving force of the present vehicle can be controlled so as to be less than the first driving force limit value by reducing the first driving force limit value immediately to the appropriate value even in the case where the acceleration pedal is depressed.

It may be arranged such that the second driving force limit value calculation device calculates the second driving force limit value such that a variation of the second driving force limit value per a predetermined time is less than a predetermined value.

It may be arranged such that the second driving force limit value calculation device calculates the second driving force limit value at a constant period; and the second driving force limit value calculation device calculates the second driving force limit value such that a variation from a previously calculated second driving force limit value is less than a predetermined value.

In these cases, since the variation of the second drive force limit value calculated based on the requested driving force is controlled so as to be less than a predetermined value, the second drive force limit value can be less than the requested driving force in the case where the requested driving force rapidly increases. Therefore, the acceleration of the present vehicle can be suppressed. As a result, the travel speed can be prevented from significantly exceeding the speed limit.

It may be arranged such that the second driving force limit value calculation device calculates the second driving force limit value such that a variation of the second driving force limit value per a predetermined time is less than a predetermined value only when the variation is a positive value.

It may be arranged such that the second driving force limit value calculation device calculates the second driving force limit value at a constant period; and the second driving force limit value calculation device calculates the second driving force limit value such that a variation from a previously calculated second driving force limit value is less than a predetermined value only when the variation is a positive value.

In these cases, since the variation of the second drive force limit value calculated based on the requested driving force is controlled so as to be less than a predetermined value only when the variation is a positive value, it is possible to reduce the second drive force limit value along with the requested driving force in the case where the requested driving force rapidly decreases. Therefore, the travel speed can be rapidly reduced. As a result, it is possible to prevent an operator from feeling discomfort.

DETAILED DESCRIPTION OF THE INVENTION

An embodiment of the present invention is explained below with reference to the drawings.
(Travel Speed Limiting Apparatus)

Figure 1:
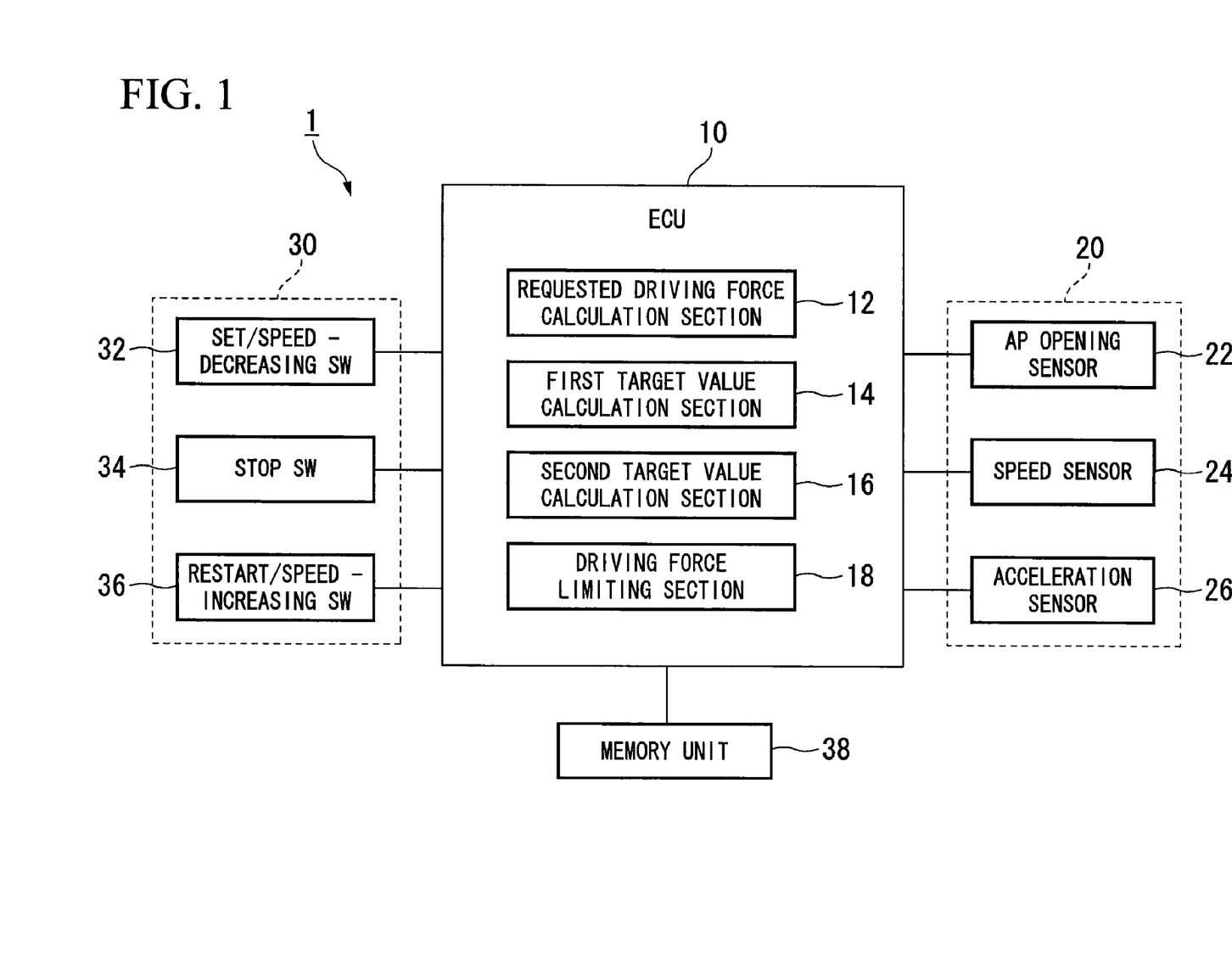
FIG. 1 is a block diagram of a travel speed limiting apparatus according to an embodiment of the present invention.

FIG. 1 is a block diagram of a travel speed limiting apparatus according to the present embodiment. The travel speed limiting apparatus 1 includes a vehicle status sensor 20, a speed limit set switch 30, and ECU 10 which calculates a target AP opening and the like. The AP opening sensor 10 includes an AP opening sensor 22 which detects an acceleration pedal opening (hereinafter referred to as an AP opening), a speed sensor 24 (travel speed measurement device), and an acceleration sensor 26 which measures an acceleration of the present vehicle.

The speed limit set switch 30 includes a set/speed-decreasing switch 32, a stop switch 34, and a restart/speed-increasing switch 36. In setting the speed limit, first, the set switch 32 is pressed to display a value of the speed limit on an instrument panel or the like mounted on the present vehicle. The speed-decreasing switch 32 or the speed-increasing switch 36 is then pressed to set the speed limit to a desired valued by increasing or decreasing the displayed value. Based on the speed limit, a speed limit mode is automatically started with the travel speed limiting apparatus 1. The speed limit set in the above operation is recorded on a memory unit 38 (speed limit memory device).

In the case of returning to a normal travel from the speed limit mode, the stop switch 34 is pressed. If it is desired to restart the speed limit mode, the restart switch 36 is then pressed. In this case, the speed limit recorded when the speed limit mode is terminated is read out from the memory unit 38 to restart the speed limit mode based on the speed limit. Here, it is optionally possible to change the speed limit by pressing the speed-decreasing switch 32 or the speed-increasing switch 36.

The ECU (Electronic Control Unit) 10 is provided with a requested driving force calculation section 12 which calculates a requested driving force based on the acceleration pedal operation by the operator of the present vehicle. In general, an output (driving force) of a driving source (such as an engine or a motor) is changed in proportion to an acceleration pedal opening operated by an operator. For this reason, the requested driving force calculation section 12 is designed to calculate the requested driving force which is requested by an operator, based on an actual AP opening detected by the AP opening sensor 22.

The ECU 10 is further provided with a first target value calculation section 14 which calculates a first driving force limit value based on the deviation of the actual travel speed from the speed limit. The first target AP opening is set such that the deviation becomes small, and is used to control the driving force of the present vehicle. The practical calculation procedure is described later. Note that the first target AP opening is used for limiting the driving force of the present vehicle (e.g., engine output), but is not used for limiting the actual AP opening or is not a target of the actual AP opening.

In addition, the ECU 10 is provided with a second target value calculation section 16 which calculates a second driving force limit value based on the actual AP opening. The second target value calculation section 16 calculates a second target AP opening as the second driving force limit value. The second target AP opening is set so as to be slightly higher than the actual AP opening. The practical calculation procedure is described later. Note that the second target AP opening is also used for limiting the driving force of the present vehicle (e.g., engine output), but is not used for limiting the actual AP opening or is not a target of the actual AP opening, like the above-described first target AP opening.

Moreover, the ECU 10 is provided with a driving force limiting section 18 which calculates an eventual driving force limit value. The driving force limiting section 18 calculates an eventual target AP opening as the eventual driving force limit value. The eventual target AP opening is set to the smaller of the first target AP opening and the second target AP opening.

In the case where the actual AP opening is less than or equal to the eventual target AP opening, the requested driving force corresponding to the actual AP opening is employed as the driving force of the present vehicle. However, in the case where the actual AP opening is greater than the eventual target AP opening, the eventual driving force limit value corresponding to the eventual target AP opening is employed as the driving force of the present vehicle. In the latter case, the driving force of the present vehicle is smaller than the requested driving force corresponding to the actual AP opening. For this reason, the driving force of the present vehicle can be controlled so as to be less than the driving force limit value (a first and second eventual driving force limit value).

The travel speed limiting apparatus 1 accordingly can perform the travel control of the present vehicle by extracting driving force from the driving source (e.g., controlling an output of the engine) based on the driving force of the present vehicle set at the driving force limiting section 18.

(Travel Speed Limiting Method)

Below is a detailed explanation of the travel speed limiting method according to the present embodiment.

Figure 2:
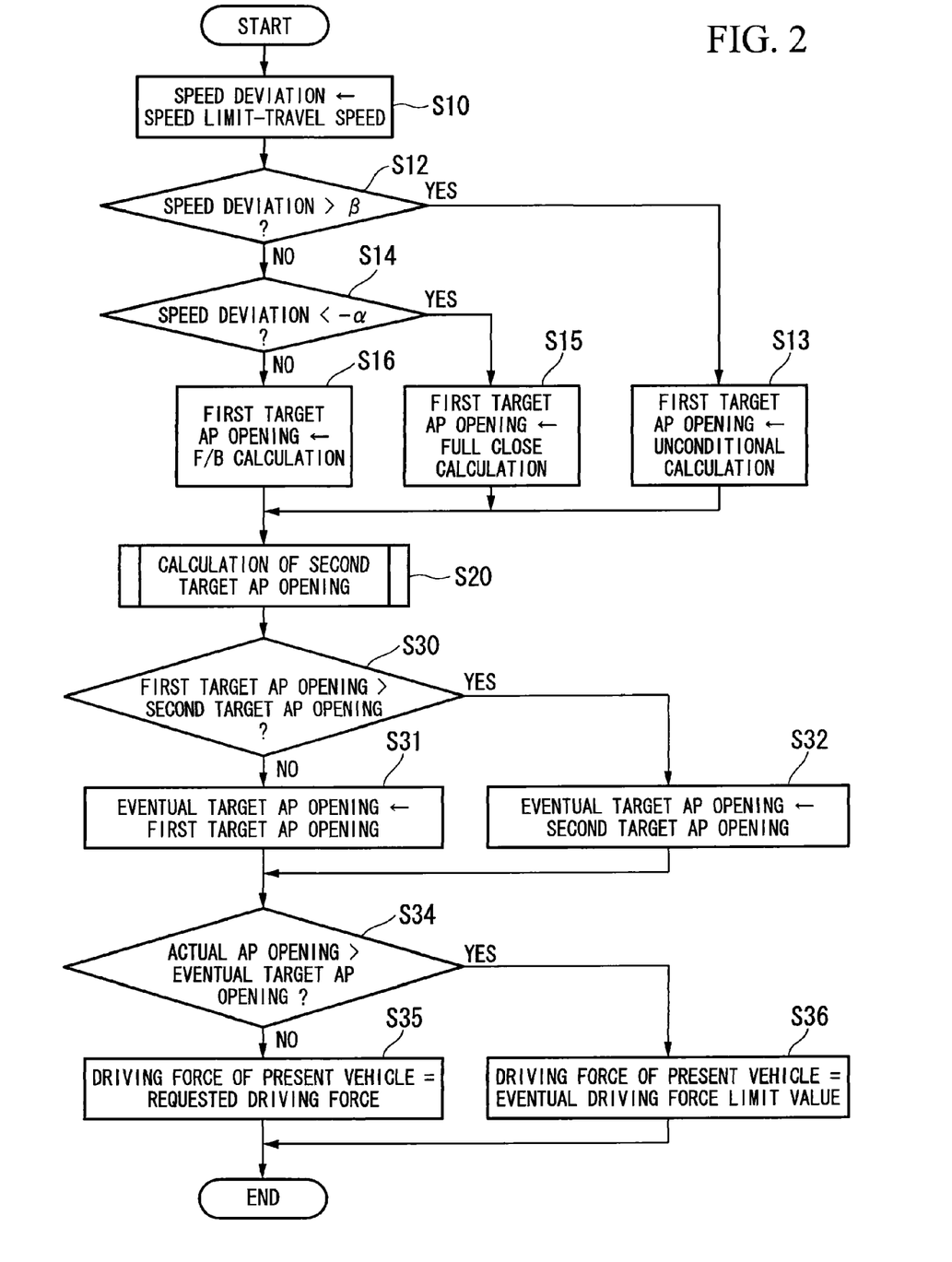
FIG. 2 is a flow chart of a travel speed limiting method according to the embodiment.

FIG. 2 is a flow chart of the travel speed limiting method according to the embodiment. In S10, the speed deviation is calculated by subtracting a travel speed measured by the speed sensor 24 from a speed limit set by the operator. In the following S12 to S16, a first target AP opening is calculated by the first target value calculation section 14 such that the speed deviation decreases.

In S12, whether or not the speed deviation is greater than $\beta$ is determined. $\beta$ is a value greater than zero, for example, being 2 to 10 km/h. If the determination is YES, in which the travel speed is much smaller than the speed limit, the first target AP opening is calculated with unconditional calculation in S13. According to the unconditional calculation, the first target AP opening is made to increase so as to be fully opened within a predetermined time. The unconditional calculation is shown as the following equation.

First target $AP$ opening=Previous eventual target $AP$ opening+$\Delta AP$ opening for the unconditional calculation (1)

Namely, the first target AP opening is calculated by adding the variation of the AP opening for the unconditional calculation to the previous eventual target AP opening calculated by the driving force limiting section 18.

However, if the determination is NO in S12 (the speed deviation$\leq \beta$), then the process proceeds to S14 in which whether or not the speed deviation is smaller than $-\alpha$ is determined. The $\alpha$ is a value greater than zero, for example, being 2 km/h. If the determination in S14 is YES, in which the travel speed is much greater than the speed limit, the first target AP opening is calculated with a full close calculation in S15. According to the full close calculation, the first target AP opening is made to decrease so as to be fully closed within a predetermined time. The full close calculation is shown as the following equation.

First target $AP$ opening=Previous eventual target $AP$ opening−$\Delta AP$ opening for the full close calculation (2)

Namely, the first target AP opening is calculated by subtracting the variation of the AP opening for the full close calculation from the previous eventual target AP opening calculated by the driving force limiting section 18.

The determination in S14 is NO ($-\alpha \leq$ speed deviation$\leq \beta$), in which the travel speed is close to the speed limit, the first target AP opening is calculated with a feedback (F/B) calculation in S16. The feedback calculation is shown as the following equation.

$$\begin{aligned}\text{First target } AP \text{ opening} = & \\ \text{Previous eventual target } AP \text{ opening} &+ \text{Speed deviation} \\ \text{correction value} &- \text{Acceleration correction value} = \\ \text{Previous eventual target } &AP \text{ opening} + \\ P \text{ coefficient} \times \text{Speed deviation} &- D \text{ coefficient} \times \text{Acceleration}\end{aligned} \quad (3)$$

Namely, the speed deviation correction value is calculated by multiplying the speed deviation by the P (Proportional control) coefficient, while the acceleration correction value is calculated by multiplying the acceleration by the D (Derivative control) coefficient. The first target AP opening is calculated by adding the speed deviation correction value to the previous eventual target AP opening and subtracting the acceleration correction value from the previous eventual target AP opening, the previous eventual target AP opening being calculated by the driving force limiting section 18.

Note that the travel speed is made to decrease along with the reduction of the first target AP opening with the full close calculation in S15. However, the travel speed does not significantly fall below the speed limit because the employed calculation is switched to the feedback calculation in S16 when the speed deviation$\geq -\alpha$. In addition, the travel speed is allowed to increase along with the increase of the first target AP opening with the unconditional calculation in S13. However, the travel speed does not significantly exceed the speed limit because the employed calculation is switched to the feedback calculation in S16 under the condition of the speed deviation$\leq \beta$.

In the following S20, the second target AP opening is calculated by the second target value calculation section 16.

Figure 3:
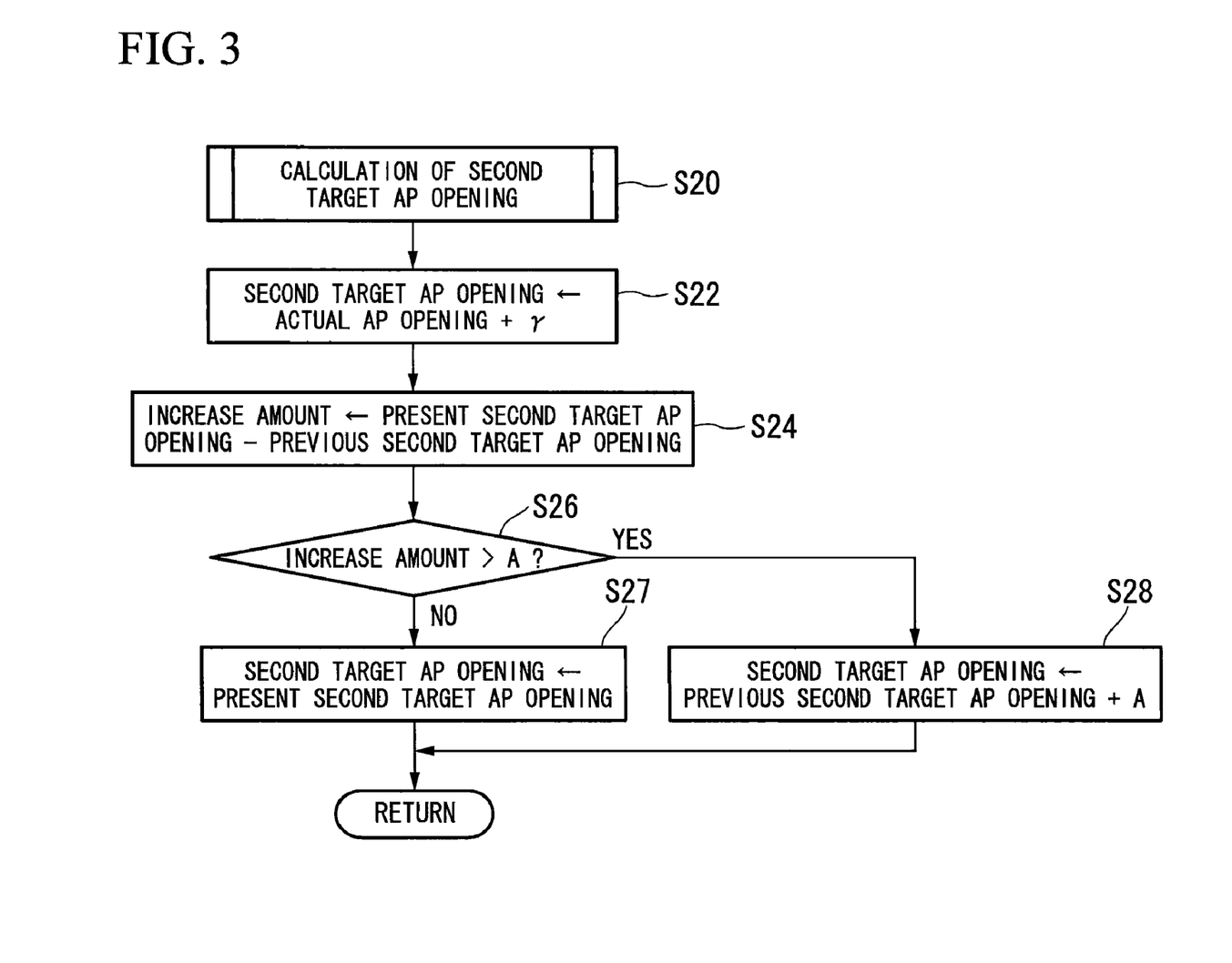
FIG. 3 is a flow chart showing a subroutine for calculating a second target AP opening.

FIG. 3 is a flow chart showing a subroutine for calculating the second target AP opening. In S22, the second target AP opening is calculated by adding a predetermined value $\gamma$ which is greater or equal to zero to the actual AP opening detected with the AP opening sensor 22. It is optionally possible to calculate the second target AP opening by multiplying the actual AP opening by a predetermined value greater than or equal to 1.

In the following S24, the increase amount of the second target AP opening is calculated. More specifically, the increase amount of the second target AP opening per a predetermined time (calculation period of the second driving force limit value) is calculated by calculating the second driving force limit value at a constant period, and then subtracting the previously calculated second target AP opening from the presently calculated second target AP opening. In the following S26, whether or not the increase amount of the second target AP opening is greater than a predetermined value A is determined. The determination in S26 is NO, in which the increase amount of the second target AP opening is small, the second target AP opening is set to the presently calculated second target AP opening. If the determination is in S26 is YES, in which the increase amount of the second target AP opening is large, the second target AP opening is set to the presently calculated second target AP opening plus the predetermined value A. Therefore, the increase of the second driving force limit value can be controlled so as to be less than the predetermined value A.

Returning to FIG. 2, whether or not the first target AP opening is greater than the second target AP opening by the driving force limiting section 18 in S30. If the determination in S30 is NO, then the process proceeds to S31 in which the eventual target AP opening is set to the first target AP opening which is smaller. However, if the determination in S30 is YES, then the process proceeds to S32 in which the eventual target AP opening is set to the second target AP opening which is smaller.

In the following S34, whether or not the actual AP opening is greater than the eventual target AP opening is determined. If the determination in S34 is NO, the process proceeds to S35 in which the driving force of the present vehicle is set to the requested driving force corresponding to the actual AP opening which is smaller. However, if the determination in S34 is YES, the process proceeds to S36 in which the driving force of the present vehicle is set to the eventual driving force limit value corresponding to the eventual target AP opening which is smaller.

By extracting the driving force of the present vehicle from the driving source, which is set in accordance with the above-described procedure (e.g., by controlling the output of the engine based on the set driving force of the present vehicle), the travel speed can be controlled so as not to exceed the speed limit.

Figure 4A:
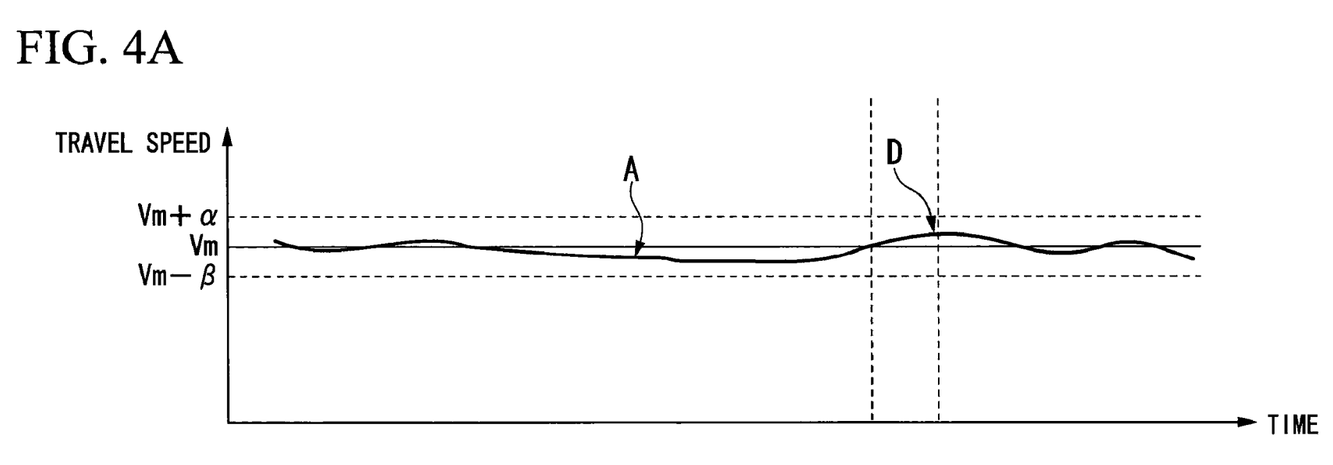
FIG. 4A and FIG. 4B are graphs showing a relationship between AP opening and travel speed in the travel speed limiting apparatus according to the embodiment.
Figure 4B:
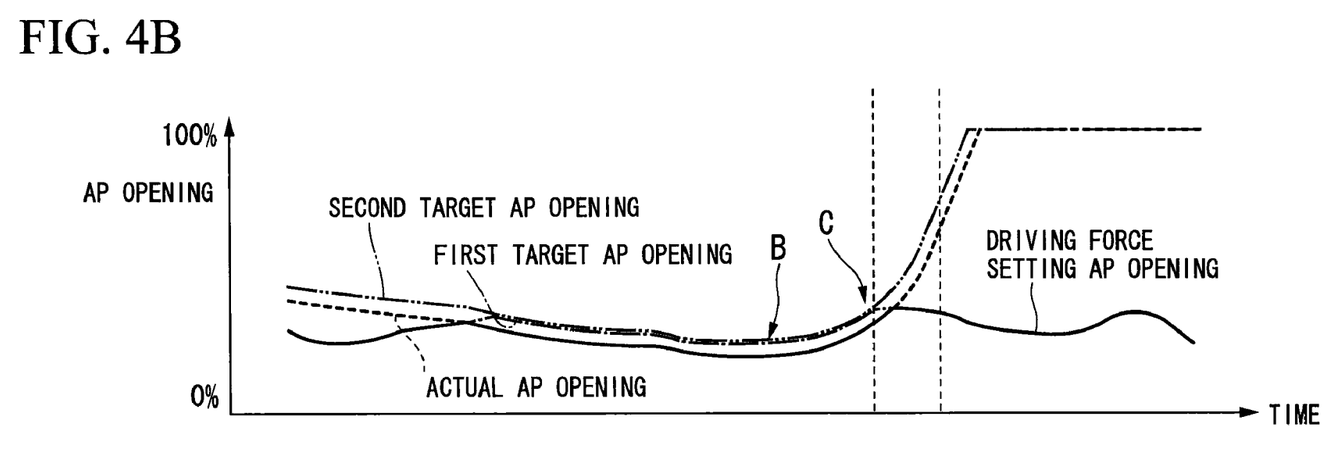

FIG. 4A and FIG. 4B are graphs showing a relationship between the AP opening and the travel speed in the travel speed limiting apparatus according to the present embodiment. Note that the actual AP opening shown in FIG. 4B is correspondent to the actual AP opening in FIG. 5A and FIG. 5B. As shown in FIG. 4B, the second target AP opening is set so as to be slightly greater than the actual AP opening. In addition, the eventual target AP opening is set to the smaller of the first target AP opening and the second target AP opening, while the driving force setting AP opening is set to the smaller of the eventual target AP opening and the actual AP opening. The first target AP opening does not significantly exceed the second target AP opening (and the actual AP opening), since the first target AP opening is set on the basis of the previous eventual target AP opening with the above equation (3).

In the above-described present embodiment, the second target AP opening is calculated based on the requested driving force, and the smaller of the first target AP opening and the second target AP opening is employed as the eventual target AP opening. Because of this, the eventual target AP opening does not increase as shown in FIG. 4B ("B" portion in the figure) in the case where the travel speed is kept less than or equal to the speed limit Vm as shown in FIG. 4A ("A" portion in the figure) since the correction value based on the speed deviation can be prevented from being accumulated. Furthermore, the driving force of the present vehicle is controlled to be less than or equal to the eventual driving force limit value which is correspondent to the eventual target AP opening. Therefore, the acceleration of the present vehicle can be suppressed even in the case where the acceleration pedal is depressed ("C" portion in the figure). As a result, as shown in FIG. 4A, the travel speed can be prevented from significantly exceeding the speed limit ("D" portion in the figure).

However, without the following feature of the present invention, the driving force of the present vehicle would be set to the requested driving force based on the actual AP opening from the depressing of the pedal till the first target AP opening becomes smaller than the actual AP opening. This would cause the present vehicle to accelerate and slightly exceed the speed limit.

In the present embodiment, as shown in S26 and S28 of FIG. 3, the increase amount of the second target AP opening calculated based on the actual AP opening is limited to be less than or equal to the predetermined value A. With this limitation, the second target AP opening can be made smaller than the actual AP opening in the case where the actual AP opening rapidly increases. By setting the driving force of the present vehicle to the second driving force limit value based on the above second target AP opening, the acceleration of the present vehicle can be suppressed more reliably. As a result, the travel speed can reliably be prevented from exceeding the speed limit.

Note that the present invention is not limited to the above-described embodiment.

The target AP opening is calculated as a driving force limit value in the above embodiment, however, a target throttle opening or a target fuel injection amount may be employed instead of the target AP opening.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A travel speed limiting apparatus comprising:
a travel speed measurement device which measures a travel speed of a vehicle;
a speed limit memory device which stores a speed limit set by an operator of the vehicle;
a first driving force limit value calculation device which calculates a first driving force limit value based on a deviation of the travel speed from the speed limit;
a requested driving force calculation device which calculates a requested driving force based on an acceleration operation by the operator; and
a second driving force limit value calculation device which calculates a second driving force limit value based on the requested driving force, wherein
the driving force limiting device sets a target driving force limit value to the smaller of the first driving force limit value and the second driving force limit value, and controls the driving force of the vehicle to be less than the target driving force limit value.

2. The travel speed limiting apparatus according to claim 1, wherein
the second driving force limit value calculation device employs a value higher than or equal to the requested driving force as the second driving force limit value.

3. The travel speed limiting apparatus according to claim 1, wherein
the second driving force limit value calculation device calculates the second driving force limit value by adding a predetermined value to the requested driving force.

4. The travel speed limiting apparatus according to claim 1, wherein
the second driving force limit value calculation device calculates the second driving force limit value such that a variation of the second driving force limit value per a predetermined time is less than a predetermined value.

5. The travel speed limiting apparatus according to claim 1, wherein the second driving force limit value calculation device calculates the second driving force limit value at a constant period; and the second driving force limit value calculation device calculates the second driving force limit value such that a variation from a previously calculated second driving force limit value is less than a predetermined value.

6. The travel speed limiting apparatus according to claim 1, wherein the second driving force limit value calculation device calculates the second driving force limit value such that a variation of the second driving force limit value per a predetermined time is less than a predetermined value only when the variation is a positive value.

7. The travel speed limiting apparatus according to claim 1, wherein the second driving force limit value calculation device calculates the second driving force limit value at a constant period; and the second driving force limit value calculation device calculates the second driving force limit value such that a variation from a previously calculated second driving force limit value is less than a predetermined value only when the variation is a positive value.

8. The travel speed limiting apparatus according to claim 1, wherein the first driving force limit value calculation device further calculates the first driving force limit value based on a previous value of the target driving force limit value; and wherein the second driving force limit value calculation device further calculates the second driving force limit value by adding a predetermined value to the requested driving force.

* * * * *